United States Patent
Orsi, III et al.

(10) Patent No.: US 12,445,966 B2
(45) Date of Patent: Oct. 14, 2025

(54) RANCH REMOTE

(71) Applicant: Down Range Controls LLC, San Antonio, TX (US)

(72) Inventors: Peter John Orsi, III, San Antonio, TX (US); Corey Andres Harbert, San Antonio, TX (US)

(73) Assignee: Down Range Controls LLC, San Antonio, TX (US)

( * ) Notice: Subject to any disclaimer, the term of this patent is extended or adjusted under 35 U.S.C. 154(b) by 476 days.

(21) Appl. No.: 17/935,115

(22) Filed: Sep. 25, 2022

(65) Prior Publication Data

US 2023/0095232 A1    Mar. 30, 2023

Related U.S. Application Data

(60) Provisional application No. 63/248,992, filed on Sep. 27, 2021.

(51) Int. Cl.
*H04W 52/02* (2009.01)

(52) U.S. Cl.
CPC .............................. *H04W 52/0241* (2013.01)

(58) Field of Classification Search
CPC .................................................. H04W 52/0241
See application file for complete search history.

(56) References Cited

U.S. PATENT DOCUMENTS

| 11,774,944 | B2 * | 10/2023 | Cella | G06N 20/00 |
| | | | | 700/275 |
| 2005/0284381 | A1 * | 12/2005 | Bell | A01K 5/0283 |
| | | | | 119/51.02 |
| 2018/0238955 | A1 * | 8/2018 | Bango | G08B 21/02 |
| 2019/0380311 | A1 * | 12/2019 | Crouthamel | A01K 11/004 |
| 2021/0360900 | A1 * | 11/2021 | Karwacki | A01K 5/0266 |
| 2024/0019290 | A1 * | 1/2024 | Hügler | G01S 13/345 |
| 2024/0081279 | A1 * | 3/2024 | Pesonen | A01K 5/0275 |
| 2024/0183799 | A1 * | 6/2024 | Asefi | G01N 22/04 |

* cited by examiner

*Primary Examiner* — Fayyaz Alam

(57) ABSTRACT

The Ranch Controller may enable Radio Frequency (RF) control of various downrange controllers (DRCs) at ranges greater than >50 meters via a portable device (RFFC), connecting to an individual's mobile phone via Bluetooth. The method for using the Ranch Controller includes connecting to the RFFC via Bluetooth, followed by sending commands and receiving feedback and status updates from various selectable DRCs.

18 Claims, 6 Drawing Sheets

ND REMOTE

BACKGROUND

Many Americans have grown accustomed to using their devices to control things in everyday life. This is largely due to the availability of blue tooth, WiFi, and cellular devices that are integrated with everything in the household, the car, and on the jobsite. This connectivity enables efficiency, as well as the flow of data to the developer, shrinking the feedback loop of technological development. Most current systems, if not all, rely on proximity to a WiFi router (internet hub), and the availability of internet access or a cellular network to facilitate data flows, patch updates, and remote accessibility without close proximity to the controlling device. The system disclosed below may enable Radio Frequency (RF) control of various Down Range Controllers (DRCs) at ranges greater than >50 meters via a portable device a RF Field Controller (RFFC), connecting to an individual's mobile phone via Bluetooth. Once connected to the RFFC Bluetooth device, the user may run the R.I.F.T Mobile application to interact with the DRC via the RFFC.

BRIEF DESCRIPTION OF THE DRAWINGS

These drawings illustrate certain aspects of the presented disclosure and should not be used to limit or define the disclosure.

DETAILED DESCRIPTION

The present disclosure is directed to a system to provide long-range radio supervisory power control and data acquisition and monitoring of remote system with near-real time data transmission and deterministic feedback. This deterministic approach provides the user the ability to receive, transmit data, and commands with transmission confirmation reported back to the controlling system. When used, the device may provide the user mobile device access to remote control systems (DRC) that are "off-the-grid" and often operate on low voltage batteries or solar power. The small RFFC device may act as the communication bridge which may communicate with the user's mobile device via a Bluetooth, while simultaneously communicating with multiple DRC devices. Bluetooth. The system described is referred to as a R.I.F.T below.

Figure 1B:
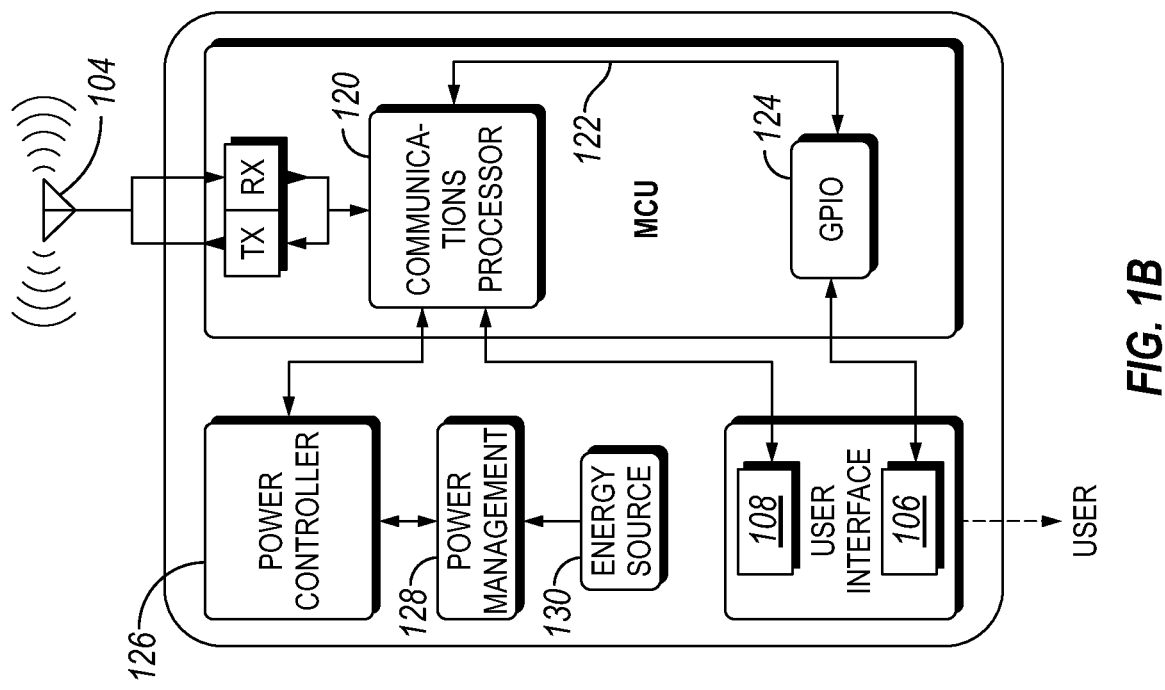
FIGS. 1A & 1B illustrate a RADIO FREQUENCY FIELD CONTROLLER (RFFC)
Figure 1A:
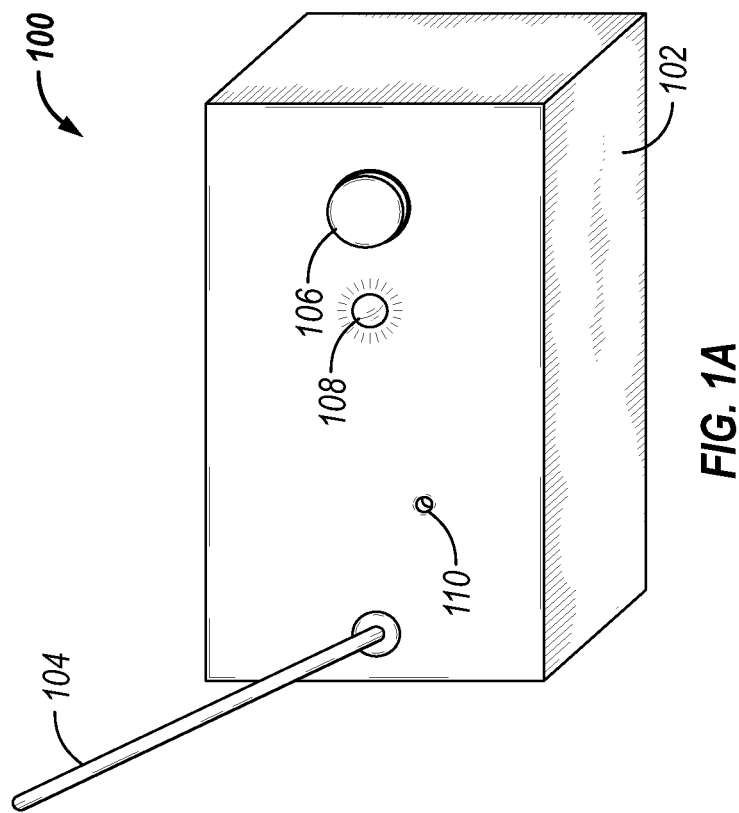

FIG. 1A illustrates a Radio Frequency Field Controller (RFFC) 100. As illustrated, RFFC 100 may comprise an outer housing 102. Outer housing 102 may be any size and shape. Additionally, outer housing 102 may be any suitable material, such as, but not limited to, plastic, metal, and/or any combination thereof. Further illustrated is antenna 104, which may be an external antenna that may be expandable, moveable, retractable. And/or detachable. Additionally, antenna 104 may be internal and may be disposed within outer housing 102. In examples, RFFC 100 may further comprise multiple activation toggle modules which provide the user with direct interaction with RFFC 100 and remotely provide control to a DRC, discussed below. Activation toggle 106 may be a button, a switch, a dial, and/or the like. Activation toggle 106 may be connected to the Bluetooth® receiver/transmitter and a microcontroller unit (MCU), discussed below, which may allow a user to interact and perform operations on RFFC 100 and provide the interface to connect a mobile device to RFFC 100. Activation toggle 106 may operate to turn RFFC 100 device on/off, open a Bluetooth® connection, or reset RFFC 100 depending on the cadence of activation. In other examples, activation toggle 106 may also allow the user transmit commands to the connected DRC device. Reset toggle 110 may be a button, a switch, a dial, and/or the like. Reset toggle 110 may operate RFFC 100 depending on the cadence of button pushes to perform factory reset of RFFC 100, to return the device to the factory default configuration. During operation, a user may use RFFC 100 to connect to a down-range controller (DRC) 200, discussed below, through a radio frequency (RF) transmitter/receiver that is attached or is antenna 104. RFFC 100 may further comprise a rechargeable power source (not illustrated), which may allow RFFC 100 to be recharged and operate. The operational state of RFFC 100 may be reflected in indicator 108. For example, if indicator 108 is an RGB LED, it may turn a color when RFFC 100 is turned on, then automatically attempt to pair via Bluetooth® to the last mobile device it may be paired to, if it is in range of RFFC 100. If automatic pairing does not occur the user may interact with RFFC 100 as stated above using activation toggle 106 and place RFFC 100 into Bluetooth® pairing mode, in which indicator 108 may then flash blue. In other examples, during a period of inactivity, RFFC may shut down. A period of inactivity is defined as when RFFC 100 is not successfully paired to a mobile phone within 30 seconds, then RFFC 100 may shut down to reduce battery consumption.

FIG. 1B illustrates the internal circuitry of RFFC 100. RFFC 100 may comprise numerous components disposed or connected to a printed circuit board (PCB). In examples, antennae 104 may either be printed into the PCB, or a separate component connected to the PCB. As illustrated, antenna 104 may act as a transmitter and a receiver, which may be controlled by Communications processor module 120. Communications processor module 120 operates and functions as the RF core, (the radio system that interfaces with the analog RF and baseband circuits), and the processor for intra-board communication, such as but not limited to I2C, UART, SPI, GPIO for example. As illustrated Communications processor module 120 may be disposed on and/or is a part of microcontroller unit (MCU) 122. MCU 122 may operate and function to perform all arithmetic or logical operation. Additionally, a general-purpose input and output (GPIO) 124 may be disposed on and/or is a part of MCU 122. As illustrated, Communications processor module 120 and GPIO 124 may be connected to Communications processor module 120 via internal circuitry within the microcontroller unit (MCU). During operations GPIO 124 may operate and function the digital Inputs/Outputs (I/O) to provide an interface between activation toggle 106, microcontroller unit (MCU) and the user. GPIO 124 may further be connected to activation toggle 106 which may receive input from the user to initiate commands to RFFC 100 or transmit commands to DRC, discussed below.

In examples, when a user activates activation toggle 106, GPIO 124 received command via the digital Inputs/Outputs (I/O), which may in turn communicate with Communications processor module 120. Communications processor module 120 may provide the data and signals to a main CPU 125, in which main CPU 125 may evaluate the command type and the state of the system and may then activate indicator 108 based on show the user that a process is occurring. Processes that may be performed by Communications processor module 120 may provide systems function such as but not limited to, turning on/off RFFC 100, initiating Bluetooth® pairing mode, initiating DRC-Link mode, command the DRC spin to motor, and perform factory reset. All RFFC processes may utilize energy from a power source in order to be performed. A power controller 124 provides control to the RFFC power systems and may be connected to communications processor module 120 and provide energy related data to the communications processor module 120 for system operation. Communications processor module 120 may be connect non-volatile memory (NVM) 135 which may store static data such as, but not limited to the RFFC unique identifier, encryption access keys, previously linked DRCs, alarms, and user configuration data. NVM 135 maintains data after power is removed. NVM 135 may comprise memory locations that are read-only and not accessible by the user while other memory locations have read/write access in which the user may store configurations and values to be loaded upon boot-time. Therefore, upon boot the communications processor module 120 may read and load specified data into the run-time memory for application usage.

During operations, power controller 126 may operate and function to provide control of the RFFC power system. As illustrated, power controller 126 may be attached to power management device 128. Power management device 128 may operate and function by using electronic circuitry to condition and maximize battery input power, ultimately reducing battery consumption while maximizing RF communication range to DRC 200. Power management 128 also receives control signals from the power controller 126 to initiate startup/shutdown sequences based on the state of the system and user interaction. Thus, power management device 128 may control the energy flow from energy source 130, which may power RFFC 100 to communicate with one or more DRC's 200. In examples, RFFCE 100 may communicate wirelessly with DRC using Bluetooth® and/or radio frequency.

Figure 2A:
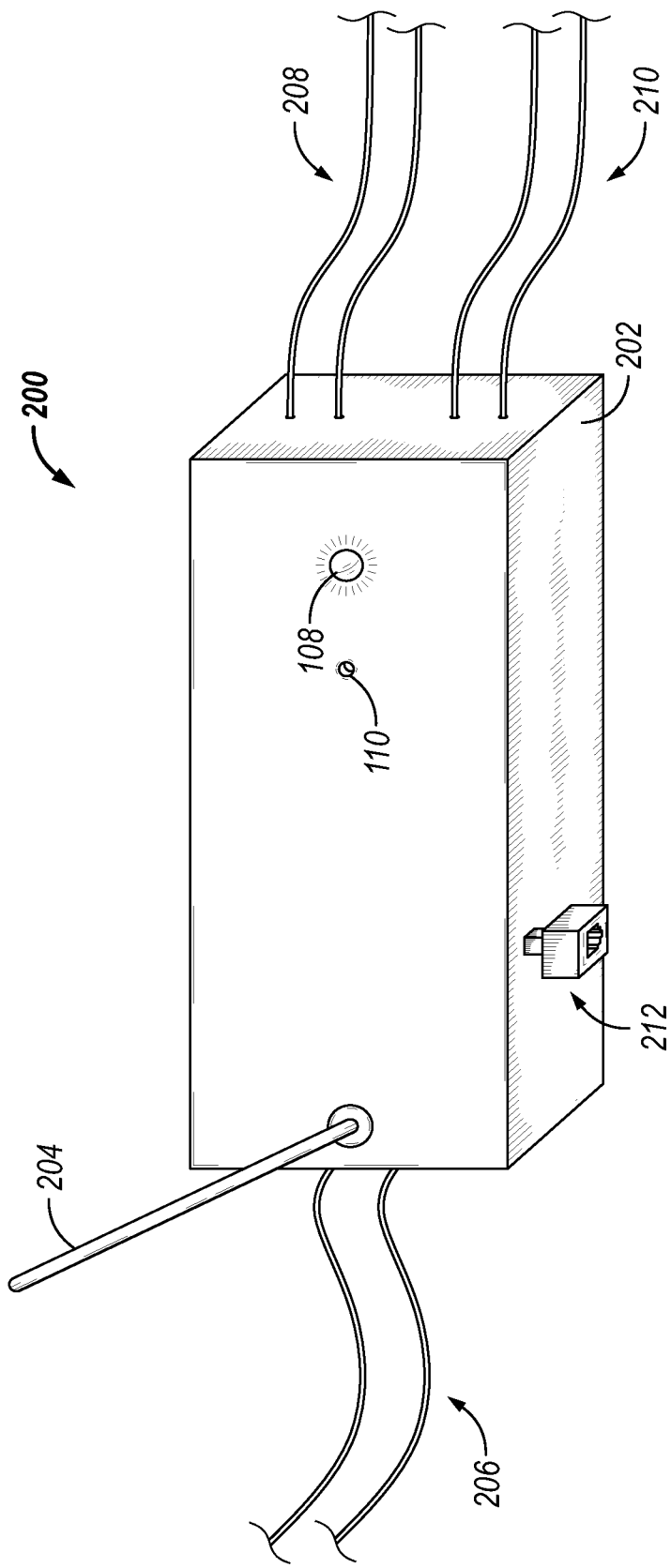
FIGS. 2A & 2B illustrates a DOWN-RANGE CONTROLLER (DRC)

FIG. 2A illustrates a down-range controller (DRC) 200. As illustrated, DRC 200 may comprise a housing 202. Housing 202 may be any size and shape. Additionally, housing 202 may be any suitable material, such as, but not limited to, plastic, metal, and/or any combination thereof. Further illustrated is antenna 204, which may be an external antenna that may be expandable, moveable, and/or retractable. Additionally, antenna 204 may be internal and may be disposed within outer housing 202. In examples, antenna 204 may be a radio frequency (RF) transmitter/receiver that may allow DRC 200 to connect to RFFC 100 (e.g., referring to FIG. 1), as discussed above. During operations, a user may query one or more DRC(s) 200. The operational state of DRC 200 may be reflected in indicator 108. For example, if indicator 108 is an RGB LED, it may turn any color when the device is turned on, and then flash any color if DRC 200 is not actively connected to a RFFC 100, any color when in DRC-Link mode discussed below, and a green color once DRC 200 establishes an active connection to an RFFC 100, and orange or red indicating critical system warning or errors. Reset toggle 110 may be a button, a switch, a dial, and/or the like. In examples, reset toggle 110 may be connected to a microcontroller unit (MCU) 122 which may allow a user to directly interact with the DRC 200. Reset toggle 110 may operate DRC 200 and depending on the cadence of button pushes may send test power signal to load or put the device DRC 200 in DRC-Link. While DRC 200 is DRC-Link Mode described below, indicator 108 may flash any color, and once DRC 200 has established a connection with RFFC 100 the indicator 108 may flash any color. DRC-Link Mode is a mode where DRC 200 is a state to accept a link/connection to a new RFFC 100. The process to link an RFFC 100 to a DRC 200. Reset toggle 110 may be a button, a switch, a dial, and/or the like. Rest toggle 110 may operate DRC 200, depending on the cadence of button pushes to perform factory reset of DRC 200 and return the device to the factory default configuration. RFFC 100 may allow the user to communicate with one or more DRCs 200 in range of RFFC 100. DRC 200 may further comprise one or more power input connections 206, one or more power output connections 208, one or more auxiliary outputs 210, and one or more accessory connections 212. These connections 206, 208, 210, and 212 may allow DRC 200 to connect to and operate any number of devices.

DRC 200 may connect to a device such as a feeder, gate opening mechanism, light house or other obstacle avoidance visual indicator, location beacon, irrigation pumps and/or a water measurement device through one or more power output connections 208, one or more auxiliary outputs 210, and one or more accessory connections 212. Feeders are used in sporting and agricultural applications to disperse animal feed on a set schedule automatically and in a self-contained system. These "feeders" are powered by a small battery, either 6 volts or 12 volts, and often remain untouched for months at a time. Conventional methods of checking their status include direct observation at their set time or viewing the feed level through a peep hole in the feeder itself. DRC 200 may also be disposed and connected to a remote irrigation pump control, where a gas powered "off grid" water pump is started and stopped to pump water from a river valley without the user needing to traverse the slope to start it or stop it. Additionally, DRC 200 may be disposed and connect to a water measurement device that measures water level. For example, once a flood has begun and an area is not safe to enter; in this example DRC 200 may be pre-positioned permanently or attached to a pole during evacuation in order to assess safety before re-entering the area. Like discussed above regarding RFFC 100, DRC 200 may comprise an activation toggle 106 and a reset toggle 110.

Figure 2B:
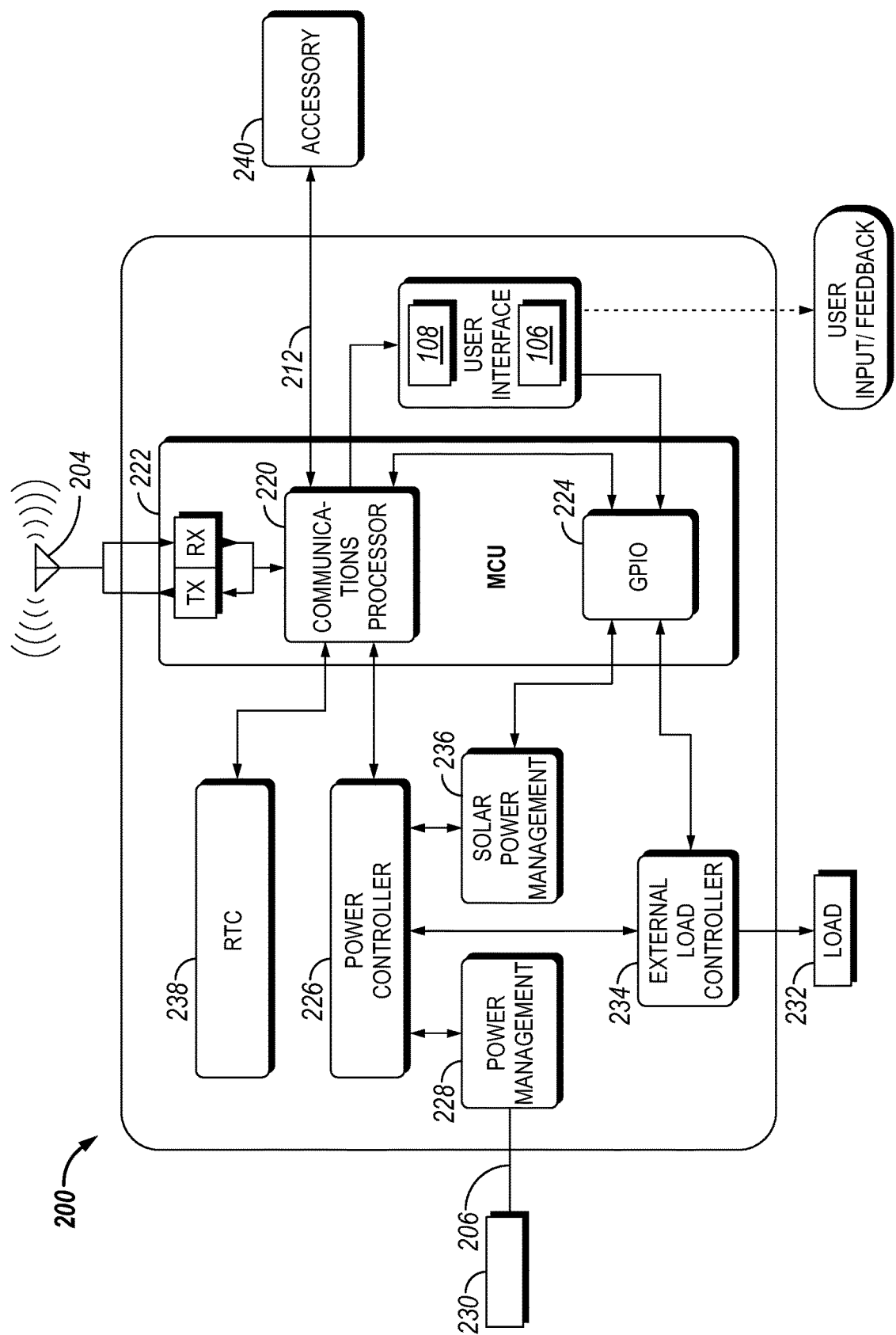

FIG. 2B illustrates the system level diagram of DRC 200. DRC 200 PCB may be comprised of over two hundred electronic components and the PCB may also comprise a whip type external antenna for antenna 204. The use of an external antenna allows the user flexibly to place the antenna in optimal location for RF reception. DRC 200 may comprise a plurality of components disposed or connected to a printed circuit board. In examples, antenna 204 may be connected to the PCB. As illustrated, antenna 204 may act as a transmitter and a receiver, which may be controlled by communications processor module 220. Communications processor module 220 performs operations for intra-board communications such as I2C, UART, SPI and various other communication protocols. Communications processor module 220 may connect non-volatile memory (NVM) 135 which may store static data such as, but not limited to DRC 200 unique identifier, encryption access keys, previously linked RFFCs 100, alarms, and user configuration data. The non-volatile memory (NVM) 135 maintains data after power is removed and contains memory locations that are read-only and not accessible by the user while other memory locations have read/write access in which the user can store configurations and values to be loaded upon boot-time. Therefore, upon boot the communications processor module 120 may read and load specified data into the run-time memory for application usage. Communications processor module 220 may connect to RTC 238 (Real-Time Clock), which purpose is to operate and function as a real-time clock and calendar that can be used to track time and date for DRC 200. RTC 238 may sustain an accurate internal time and date for DRC 200 even if power from energy source 230 is removed. The RTC 238 is powered from a power source or RTC battery, and the initial time and date is set up correctly. RTC 238 may be powered by energy source 230 or a coin cell battery in the power management module 228. Therefore, RTC 238 is expected to remain powered and keep track of time for lifetime of the device except when the rare, unexpected event occurs when energy source 230 is off and the RTC battery power is depleted. RTC 238 provides the date and time data to the Main CPU 125 via communications processor module 220 in which the Main CPU 125 may evaluate the date and time to determine if any event trigger is associated with the current time such as, but not limited to, triggering the motor to run on a user defined schedule.

As illustrated communications processor module 220 may be disposed on and/or is a part of microcontroller unit (MCU) 222. MCU 222 may operate and function to perform all arithmetic or logical operation. Additionally, a general-purpose input and output (GPIO) 224 may be disposed on and/or is a part of MCU 222. As illustrated, Communications processor module 220 and GPIO 224 may be connected to the Main CPU. During operations GPIO 224 may operate and function the digital Inputs/Outputs (I/O) to provide an interface between activation toggle 106, microcontroller unit (MCU) and the user. GPIO 224 may further be connected to activation toggle 106 which may receive input from the user to initiate commands to the DRC 200. GPIO 224 may further be connected to activation toggle 106.

In examples, when a user activates activation toggle 106, GPIO 224 receives the signal via the digital Inputs/Outputs (I/O), which in turn may communicate with communications processor module 220, to the signal to the Main CPU 125, to evaluate the command type and the state of the system and may then activate indicator 108 on indicate to the user that a process is occurring. Processes that may be trigged by activation toggle 106, may comprise, but are not limited to, DRC-Link mode, command to operate motor, reboot, and factory reset. These processes may utilize energy from a power source in order to be performed. A power controller 226 may be connected to communications processor module 220 and provide energy to communications processor module 220 for operations.

During operations, power controller 226 may operate and function as a power/energy and voltage monitor. Power controller 226 provides near real-time monitoring of the power and voltage to the critical components to ensure optimal system power efficiency. Power controller 226 provides power related data to the MCU 222 through Communications processor 220, in which MCU 222 may evaluate the data and prepare the data for transmission to the RFFC and or perform an operation on the Power management device 128 via GPIO 224 to enable or disable and system component to reduce power consumption. As illustrated, power controller 126 may be attached to power management device 128. Power management device 128 may operate and function to filter, regulate and reduce the input energy source 230 to a 3.3V output voltage which provides power to all core subsystems. Therefore, the power management device 230 may control the energy flow from energy source 230, to enable power for the DRC 200 to communicate with RFFC 100 (e.g., referring to FIGS. 1A & 1B). In examples, energy source 230 may connect to power management device 230 through power input connections 206 (i.e., referring to FIG. 2A). The power is supplied to the DRC by an external energy source 230 may be 6-volt or 12-volt battery without a settings adjustment. Devices DRC 200 may be connected to may be powered through DRC 200, which may control the flow of energy from energy source 230.

MCU 222 may be designed to be programmed with our custom firmware to ingest data from various sensors and perform actions based on the command message from RFFC 200 (e.g., referring to FIG. 1). Many potential external load devices including the feeder motor are designed to run on voltages greater than 3V, therefore DRC 200 comes equipment with components in the external load module to provide higher voltage and power to the external devices. The external load controller 234 operates and function to provide control and status of power delivery to external loads 232 such as but not limited to feeder motors. External load controller 234 is connected to GPIO 224 which provides signals to the enable/disable power to external load 232 and power controller 226 operates and function as a power monitor to check the power delivered to the external load 232 and ensure the power delivery and circuit status is within system specifications/limitations which also prevents damage to DRC 200. To ensure power is not provide to external load devices without user intent the external load controller 234 may use electronic protection circuit that would disable power delivery to the external load if the power required by the load is out of range of DRC system specifications, or if power is supplied to the external load without user initiating a command. This event may cause an overcurrent or alarm condition, which may cause the protection circuit to disable the power flow to the offending load channel. The power controller may be aware of the power delivery interruption which may trigger and alarm to be evaluated and processed by MCU 222. MCU 222 may store date and time of the alarm in NVM 135, change color of RGB indicator to indicate an alarm and may transmit an alarm code to RFFC 100 when RFFC 100 is present and connected. DRC 200 may remain in a state of alarm which may require user intervention, which may require the user to fix the offending problem and power-cycle of DRC 200 to return DRC 200 back to normal operational state. In normal operational state when a user commands power delivery to the external load connected GPIO may receive a signal of power delivery and transmit the feedback to RFFC 100 indicating successful power delivery.

In order to reduce power consumption of DRC 200, after a period of inactivity (no commands to/from a RFFC 100) lasting greater than 30 minutes, DRC 200 may enter a "sleep mode"/low power mode where DRC 200 reduces it total power by shutting down non-essential peripheral devices and may reduce the Main CPU clock frequency. During operations, DRC 200 may operate in "sleep mode" 70% of the time that the DRC is turned on to reduce overall power consumption near zero, while still maintaining core & system functionality. In "sleep mode"/low power mode the communication processor 220 "listens" for specific RF signal and message that contains a wake-up command message. In this design the term "listen" refers to where the DRC solely actively monitors RF signals on antenna 204 for specific signal. This "listen" mode may also be considered to be receive only mode. The wake-up command message is a predefined message with a predefined preamble such as 10101010. Therefore, when DRC 200 receives this predefined preamble from the RF signal on antenna 204, DRC 200 may exit sleep mode and power on all devices and subsystems. When in "sleep mode" which is defined where power consumption is reduced up to 70%, RTC 238 may remain powered to maintain date and time but power controller 226, power management 228, may put in a reduced power state in which MCU 200 may access data from the subsystem but at reduced frequency. From a system perspective DRC 200 remains fully functional but only intraboard communication is reduced and is no longer real-time measurements. In "sleep mode"/low power mode power consumption is diverted core functionality and communication processor 220. Communications processor 220 may switch to receive only mode to wake only the communications processor 220 to check the RF signals to see if the specific RF wake up command packet is received, if it not received the communications processor 220 may power down until the next communications processor 220 wake interval. During this "sleep mode"/low power mode communications processor 220 as well as the other components may remain in power down mode. Communications processor 220 may wake up ten times per second to two times per second depending on configuration but in either configuration DRC 200 may be guaranteed to receive the RF wake up command packet. Additionally, DRC 200, using MCU 222 may turns off all non-vital functionality, thereby conserving battery consumption, which also allows common solar chargers to charge the energy source 230 daily. This "sleep mode"/low power mode allows for DRC 200 to conserve power and not drain energy source 230 when DRC is not actively in communication with a RFFC 100 (e.g., referring to FIG. 1). Additionally, during operation DRC 200 may be capable of functioning and operating from power input from a solar panel 408. Based the power consumption of DRC 200, the Solar panel 408 may provide operational power for DRC 200 or charge energy source 230 through the connection to the solar power management module 236. Solar power management module 236 may be connected to the power controller which may be used to monitor the power from the solar panel 408. The power controller provides monitors the power input from the solar panel 408 and provides the data to MCU 222 via the communications processor. MCU 222 may evaluate and process the solar power data and transmit the data to RFFC 100 through the communication processor module 220. Solar power management module 236 may be connected to GPIO 224 which functions and operates control signals for the charging voltage selection and charging shutdown. MCU 222 may automatically set via GPIO 224 the charging voltage based on energy source 230 voltage based on the power data acquired by power controller 226. The charging voltage may switch the charging voltage input from approx. 7V for a 6V energy source 230 or 13V for a 12V energy source 230. Solar power management module 236 also employs charging shutdown functionality which may disable solar charging via control signals initialized from GPIO 224, in the rare occasion the solar panel 408 delivers too much power to energy source 230. This scenario could damage the battery and the DRC 200. DRC 200 may comprise contains circuitry to enhance signal quality of the wire communication bus which may allow the user to use an accessory connection such as a CAT5 cable to connect to an accessory with cable length up to ten meters. DRC 200 may comprise a wire communication bus (DRC-Bus) which provides the data channel for command and data traffic to flow between DRC 200 and connected peripheral devices. The DRC-Bus allows the user the ability to add additional sensors and peripheral devices to connect and communicate with DRC 200 and any device connected without requiring hardware changes to DRC 200.

Figure 3A:
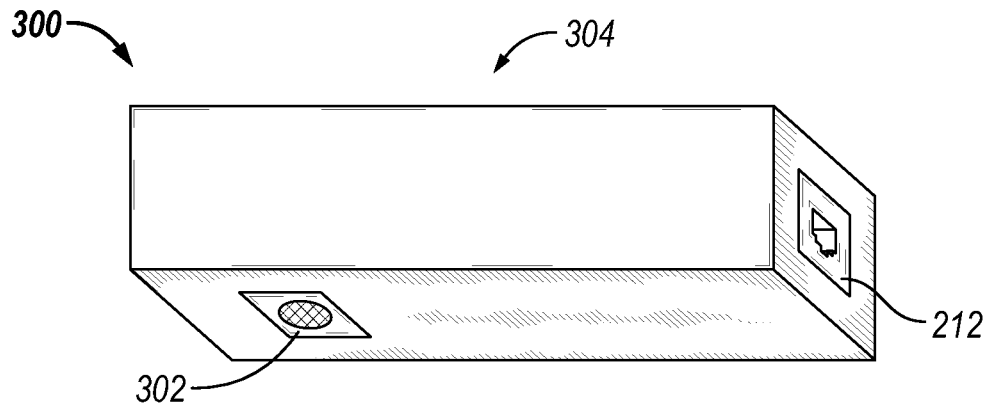
FIG. 3 illustrates a FEED SENSOR MODULE (FSM)
Figure 3B:
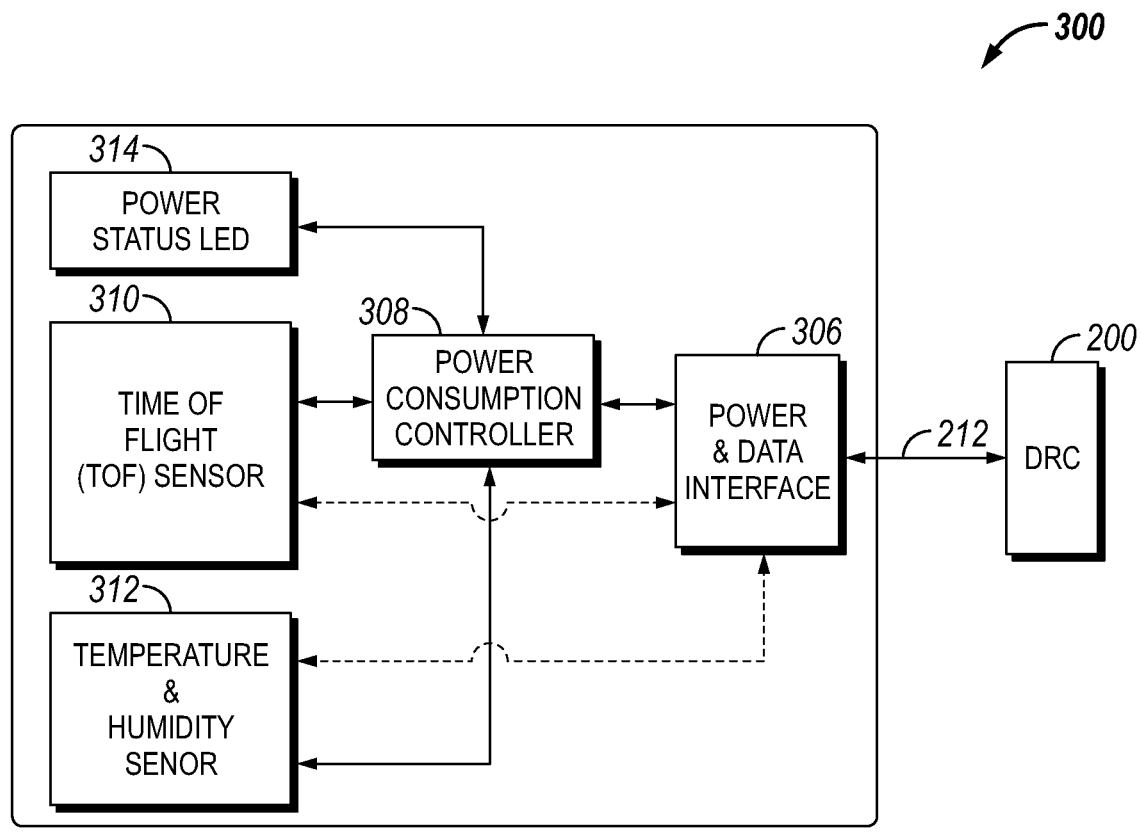

FIG. 3A illustrates a feeder sensor module (FSM) 300, which may be an accessory 240 that may be connected to DRC 200 (e.g., referring to FIG. 2B). FSM 300 may be connected to DRC 200 through one or more accessory connections 212 (e.g., referring to FIG. 2B). As illustrated, FSM 300 may comprise a distance measuring device 302. Distance measuring device 302 may be a laser distance measurement device or an ultrasonic range measurement device. Distance measurement device 302 may measure the level of feed in the hopper, or the level of some other material in a container and collect end provide environmental data to the user. FSM 500 may be connected to DRC 200 through one or more accessory connections 212 (e.g., referring to FIG. 2). FSM 300 may comprise a power and data interface 306, power consumption controller 308, temperature sensor 312, humidity sensor 312, Time of Flight (ToF) Sensor 310, and power indicator 314. The core design feature of FSM 500 is the high measurement accuracy, and low power consumption. Power indicator 314 may indicate power to FSM 500 and may be an LED. Power indicator 314 may turn on and off depending on power provided by DRC 200 and the state of the power consumption controller 308, described below. Power and data interface 306 may use an RJ-45 or any other type of interface connector to connect directly to DRC 200 with at CAT5 cable for example. Power for all the components on FSM may be supplied by DRC 200 to FSM 500 via power and data interface 306 and one or more accessory connections 212 (i.e., a CAT5 connection). Power and data interface 306 incorporate the DRC-Bus provided by DRC 200. The DRC-Bus provides the data channel for command and data traffic to flow between DRC 200 and FSM 500. Power consumption controller 308 may be designed to receive active/off control signals from DRC 200 via power and data interface 306 and activate/deactivate FSM 500 functionality to reduce power consumption. In FSM 500 off mode, FSM 500 consumes zero power. FSM 500 may embed a time of flight (ToF) sensor 310, which comprise an optical laser emitter and optical detector to determine and calculate the distance ToF sensor 310 is from an object with accuracy within inches. FSM 500 ToF sensor 310 may measure the distance from various solid or liquid materials in the feeder up to several meters based on ToF's Field of View (FOV). Once ToF sensor 310 completes its ranging process the resulting data is put on the DRC-Bus and provided to DRC 200 for processing and transmission to the user. After user input and DRC 200 processing the resulting data allows R.I.F.T user to know the amount feed material in the feeder. FSM 500 may also embed a temperature and humidity sensor 312 which allows the R.I.F.T to provide the user with temperature and humidity sensor 312 within the feeder container. The temperature sensor may provide temperature measurements within +/−0.2° C. accuracy and the humidity senor may provide the relative humidity measurements +/−2.8%. Temperature and humidity sensor 312 allows R.I.F.T user ensure the moisture and temperature levels within the feeder are at safe levels as to not ruin the feeder contents. Once temperature and humidity sensor 312 completes the data acquisition process the resulting data samples are put on the DRC-Bus and provided to DRC 200 for processing and transmission to the user. It should be noted that all distance measurements, temperature measurements, and/or humidity measurements take by FSM 500 are defined as data samples that are transmitted back to DRC 200 using methods and systems discussed above. Additionally, the data samples may be transmitted back to RFFC 100, which may communicate the data samples to a user through a mobile device and interface discussed below. Uses for this may include but should not be limited to any storage silo or tank, water containers, oil containers, rivers, creeks, tributaries, irrigation canals, or ditches, etc.

Figure 4:
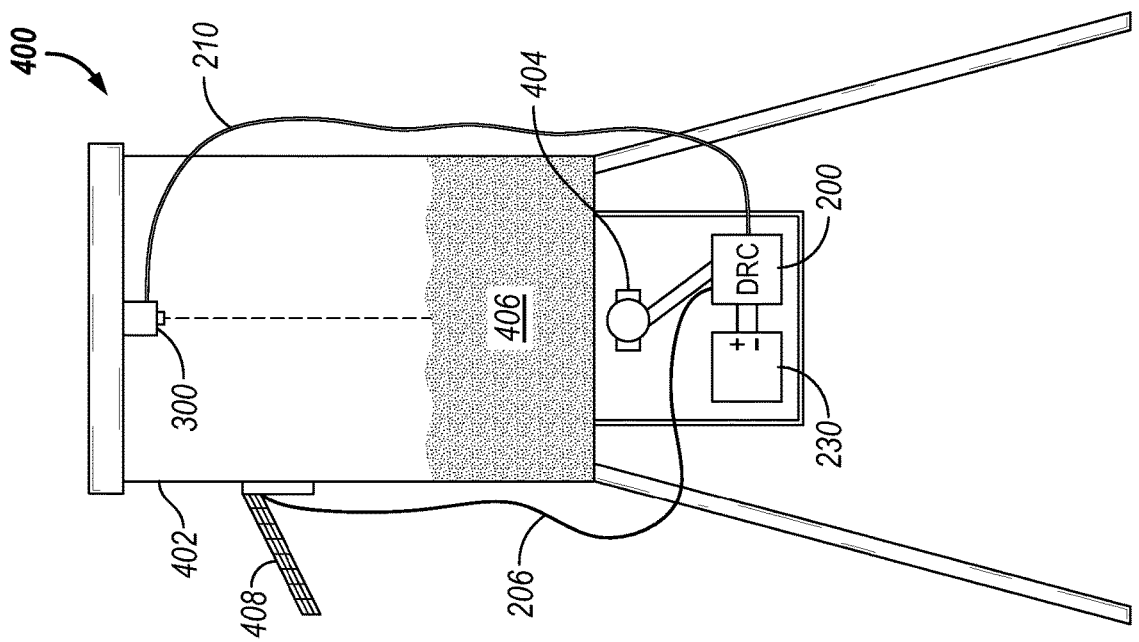
FIG. 4 illustrates the DRC connected to a device.

FIG. 4 illustrates DRC 200 that is connected to a device 400, such as a wildlife feeder. In this example, device 400 may control the operations of device 400 using the systems and methods discussed above. As illustrated, DRC 200 may be connected to FSM 300 auxiliary outputs 210. FSM 300 may be connected to device 400 using connection 304. Although materials may vary, wildlife feeders (i.e., device 400) may comprise a hopper 402 that stores feed 406. FSM 300 may be utilized to determine how much feed 306 may be in hopper 302. Additionally, device 400 may comprise a spinner motor 404 located below hopper 402 with a disc oriented upwards on the shaft above a motor that may spin the disc. Additionally, device 400 may comprise an energy source 230 that is connected to DRC 200 through one or more power input connections 206.

As noted above, DRC 200 may comprise a solar power management device 236 that connects to a solar panel 408 through one or more power input connections 206. As illustrated, solar panel 408 may be connected to hopper 402, however, solar panel 408 may be connected at any suitable location on device 400 and/or adjacent to device 400 utilizing a support structure, not illustrated. During operations, solar panel 408 may be utilized to prevent energy source 230 from becoming drained using the methods and systems discussed above. In general, DRC 200 may be utilized to dispense feed 406 twice per day for a period of up to ten seconds per session. This may be performed by spinner motor 404, which may spin the disc, allowing feed 406 to flow from the bottom of hopper 402 onto the spinning disc and get thrown out on the ground surrounding the wildlife feeder (i.e., device 400). The operation and functions of device 400 may be controlled by a user utilizing a mobile device or a desktop device, which may be connected to RFFC 100. Common differences among feeders include height of the legs, pest countermeasures (to prevent raccoons from accessing the feed), and hopper shape/size. As indicated in the illustration, the DRC is installed inside the box with the battery where the normal timer would reside, and the FSM device is attached inside the lid of the hopper using adhesive, magnets, or screws.

Figure 5:
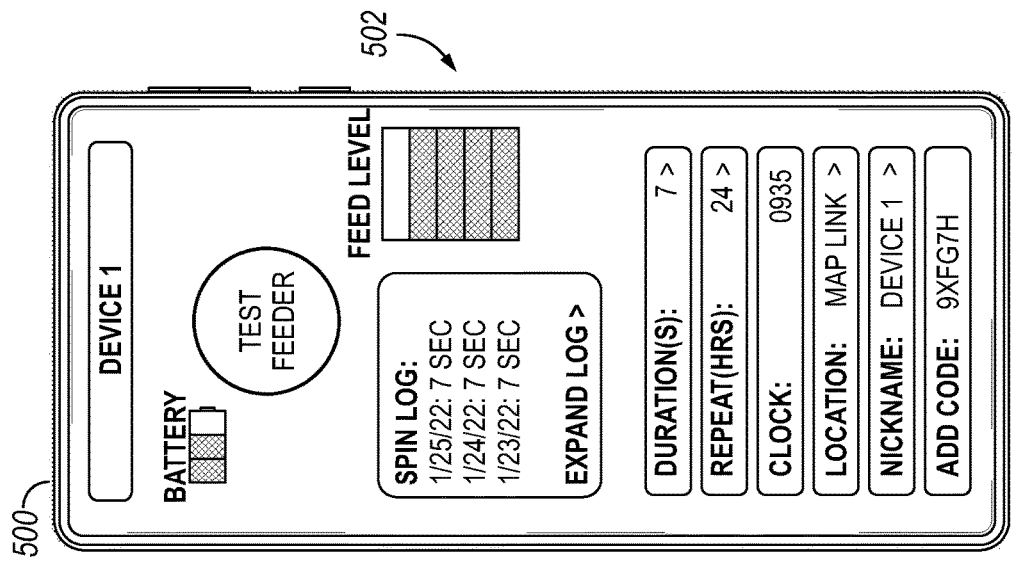
FIG. 5 illustrates a mobile device utilizing a mobile application to control the RFFC.

FIG. 5 illustrates a mobile device 500 running a mobile application for controlling RFFC 100 and thus controlling the operation and function of one or more devices 400 that have DRCs 200 connected to RFFC 100. As noted above, RFFC 100 (e.g., referring to FIG. 1) may connect to a mobile device 500 using standard BLE (Bluetooth) protocols. Mobile device 500 may control and operate RFFC 100. During operations, when RFFC 100. The mobile application may run on either iOS or Android devices. The mobile application may push a JSON file to RFFC 100 using standard BLE which may disseminate message packets to various devices. The mobile application may feature a menu 502 allowing the user to select from DRCs 200 connected to RFFC 100. Once a DRC 200 is selected, the user may view status of the device and its host (whatever mechanism it is connected to) and allow the user to send commands and adjust settings via the application. When viewing device status, the user may be able to see the log of times and durations the spinner has spun in the past, as well as the time(s) it is set to spin in the future. The user may also be able to view the level of feed 306 in hopper 302 (e.g., referring to FIG. 4) and know the percentage full/empty the hopper is at that time. The user may also be able to view the feeder battery status and the solar charger status. The user may also be able to spin the feeder on-demand from this screen for a set duration of time.

Figure 6:
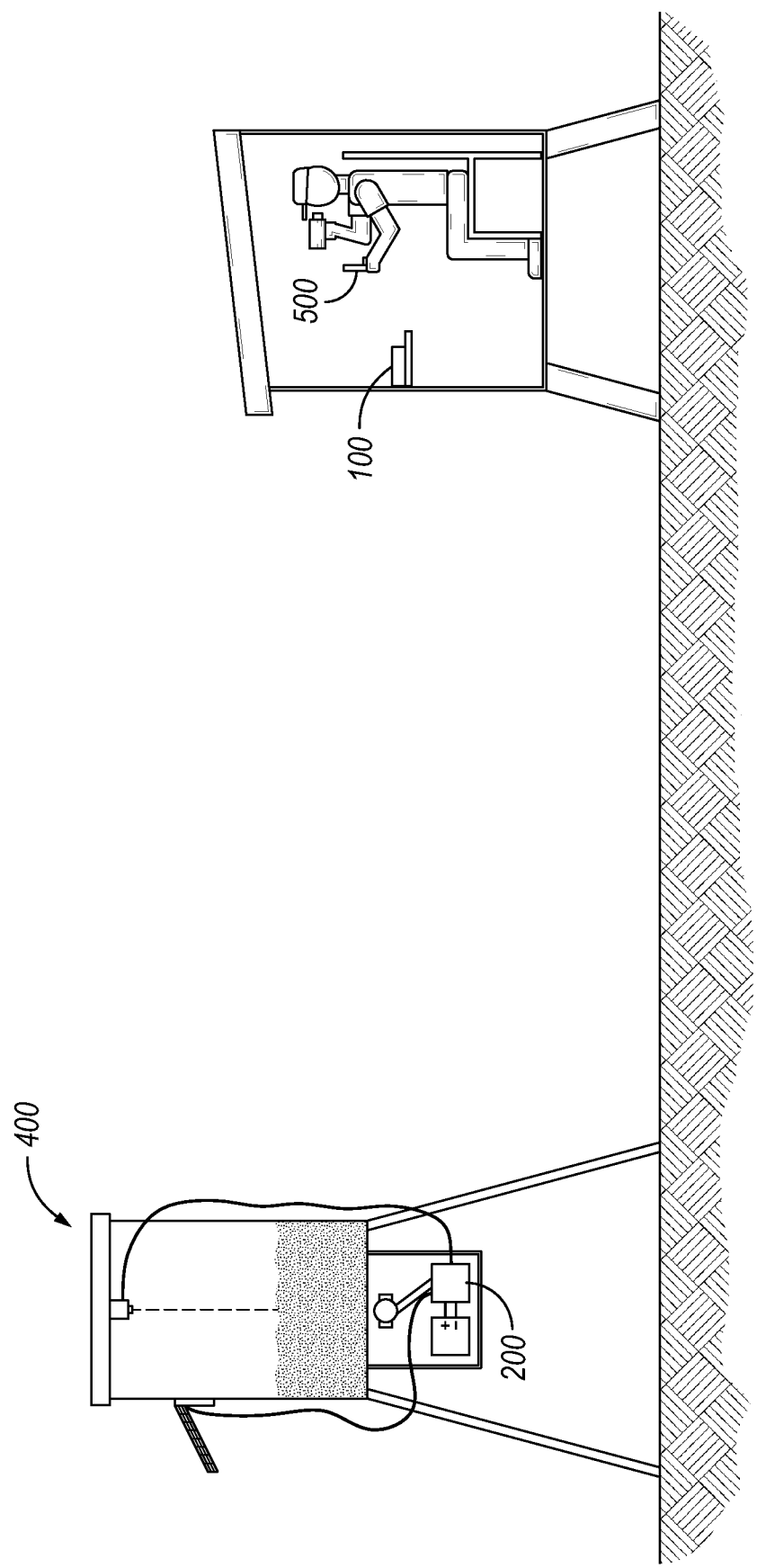
FIG. 6 illustrates an operation in which the RFFC and DRC are utilized.

FIG. 6 illustrates a user utilizing RFFC 100 and DRC 200 during an operation. As illustrated, the user is operating his/her mobile device 500 to control device 400. RFFC 100 may be connected to mobile device 500 via Bluetooth® and is connecting to DRC 200 via a sub Ghz RF. DRC 200 may connect to device 400 and may control the operations and function of device 400 using the methods and systems described above. During operations, when RFFC 100 is powered on, it may automatically send out an initial query command consisting of a message sent via a sub Ghz RF link. At this time, DRC 200 may be in sleep mode and may "hear" (i.e., receives a data packet conforming to the DRC format) a query, which causes DRC 200 to "wake up" (i.e., waking up in this case means fully powering on, sampling data and beginning to transmit packets of data) and collect data from the system it is connected to, and respond several times in repetition to the query with a "here I am" message (i.e., the "here I am" message including but not limited to DRC 200 nickname, location, and any data it collected as part of its "wake up" protocol). When RFFC 100 receives the "here I am" message, it then populates a screen on mobile device 500 on an application to show status and the ability to send commands. RFFC 100 may connect to any number of DRCs 200, and DRCs 200 may connect to any number of RFFCs 100. DRC 200 may interact with RFFC 100 based on a user determined "Nickname" saved to DRC 200. The nicknames for each DRC 200 may be displayed on mobile device 500. Nicknames may be set by the user and stored on DRC 200 so that any user query DRC 200 and see the nickname displayed on mobile device 500. After DRCs 200 are queried, a DRC screen may be populated depending on the type of DRC 200. Examples of DRC types include but are not limited to, Wildlife Feeders, Livestock feeders, container/tank level monitors, remote motion sensors, lighting controls, Gate controls, Irrigation controls, and Generator controls. Once DRCs 200 are queried, and the application screens are populated, the user may send commands, and receive feedback.

For example, on a wildlife feeder, the application screen may show the amount of feed available in the feeder, and the time elapsed since the feeder last operated. During operation, the user may have the ability to turn the feeder on/off from the application, as well as set a timer that may spin the feeder after a user set countdown. After the feeder turns on, the "last operated" clock may be reset. Additionally, DRCs 200 may automatically enter a "sleep" mode as after a period of inactivity where DRC 200 "listens" for queries but does not transmit. This allows for DRC 200 to conserve power and not drain the battery of whatever it is connected to.

Improvements of Ranch Controller include giving users a deterministic feedback loop with remote control at a range much greater than direct Wifi or Bluetooth connections can facilitate. Unlike current products that use Wifi and Bluetooth and other "off the shelf" protocols, which drain the batteries in a feeder and render it useless, the Ranch Remote does not continue full functionality during long periods of near zero interaction. Feeders utilize small lead-acid batteries that are either periodically swapped out for a full charge, or trickle charged with a small solar charger. Existing products drain the batteries quickly and "a few cloudy days"

on non-optimal solar charging can result in a drained battery a feeder ceasing function. The Ranch Remote improves on existing products when it goes into "sleep mode" where it turns off all non-vital functionality and only wakes up for short durations periodically in order to listen for signals attempting to make a connection. When in "sleep mode", the DRC uses less than 0.15 watts of power. The Ranch Controller also offers users the ability to interrogate and control multiple DRC devices which would not be possible using direct WiFi or Bluetooth connections. In addition, the DRC gives the user real-time feed level data without ever physically approaching the device. The Ranch Controller also allows users to see the feed level using the app without approaching or opening the feeder. The Ranch Remote also allows users to alter timer settings and test spin the feeder and get confirmation that it actually spun without physically going near the feeder. The Ranch Remote also allows users to see the battery status and the status of the solar charger using the app and without going near the feeder. The Ranch Controller allows the user to interact with a feeder at a distance much greater than any existing product.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the element that it introduces. All numerical values within the detailed description and the claims herein modified by "about" or "approximately" with respect to the indicated value is intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system, comprising:
   a Radio Frequency Field Controller (RFFC);
   a Down Range Controller (DRC) communicates wirelessly with the RFFC, wherein the DRC is configured to switch to a "listen only" mode to reduce power consumption and listens for queries at pre-determined intervals, and
   a Feed Sensor Module (FSM) connected to the DRC through a wire communication bus.

2. The system of claim 1, further comprising a mobile application disposed on a mobile device, and wherein the mobile application controls the RFFC using the mobile device.

3. The system of claim 2, wherein the RFFC is wirelessly connected to the mobile device.

4. The system of claim 1, further comprising an energy source that is connected to the DRC.

5. The system of claim 1, wherein the DRC and RFFC communicate with a radio frequency signal.

6. The system of claim 1, wherein the RFFC is configured to turn after a period of inactivity.

7. The system of claim 1, wherein the RFFC is configured to communicate with one or more DRCs.

8. The system of claim 1, wherein the DRC is configured to communicate with one or more RFFCs.

9. The system of claim 1, wherein the FSM transmits one or more data samples to the RFFC.

10. The system of claim 9, wherein the one or more data samples are distance measurements.

11. The system of claim 9, wherein the one or more data samples are temperature measurements.

12. The system of claim 9, wherein the one or more data samples are humidity measurements.

13. A method comprising:
    attaching a Down Range Controller (DRC) to a device, wherein the device is a feeder. a gate opening mechanism. an avoidance visual indicator, a location beacon, an irrigation pumps or a water measurement device;
    attaching a Feed Sensor Module (FSM) to the device;
    connecting the FSM to the DRC through a wire communication bus, wherein the DRC is configured to switch to a "listen only" mode to reduce power consumption and listens for queries at pre-determined intervals;
    connecting the DRC to a Radio Frequency Field Controller (RFFC) wirelessly;
    taking one or more measurements with the FSM as data samples; and
    transmitting the data samples from the FSM to the RFFC through the DRC.

14. The method of claim 13, further comprising controlling the RFFC with a mobile application disposed on a mobile device.

15. The method of claim 14, wherein the RFFC is wirelessly connected to the mobile device.

16. The method of claim 13, further comprising attaching an energy source to the DRC.

17. The method of claim 13, wherein the DRC and RFFC communicate with a radio frequency signal.

18. The method of claim 13, wherein the data samples are a distance measurement, a temperature measurement, or a humidity measurement.

* * * * *